United States Patent [19]

Roeth et al.

[11] Patent Number: 4,540,220
[45] Date of Patent: Sep. 10, 1985

[54] MEANS OF SECURING AN AXLE TO FRAME

[75] Inventors: Kenneth M. Roeth; Gerald J. Ihm, both of Dubuque, Iowa

[73] Assignee: Deere & Company, Moline, Ill.

[21] Appl. No.: 529,817

[22] Filed: Sep. 6, 1983

[51] Int. Cl.³ .............................................. B60B 35/00
[52] U.S. Cl. ................................. 301/125; 301/124 R; 180/905
[58] Field of Search ............................ 301/124 R, 125; 280/80 R, 80 A; 180/312, 88, DIG. 905, 75, 85

[56] References Cited

U.S. PATENT DOCUMENTS 3,604,527  9/1971  Price ..................................... 180/85
3,978,882  9/1976  Cornelius .............................. 180/75

FOREIGN PATENT DOCUMENTS 0809851  3/1959  United Kingdom ................. 180/75

Primary Examiner—David A. Scherbel

[57] ABSTRACT

A vehicle axle-frame mounting has a vehicle frame portion having transversely aligned generally inverted U-shaped wells. A transverse axle includes a differential casing and tubular section extending laterally and opposite from the casing. A mounting member is formed on each tubular section to be received in a respective frame well to have a generally horizontally extending interface and in spaced-apart relationship to the sidewalls of the well. A plurality of cap screws are threadably received in the lower portion of each well's sidewall such that the head of corresponding cap screws capture the lower portion of a respective mounting member therebetween.

2 Claims, 3 Drawing Figures

MEANS OF SECURING AN AXLE TO FRAME

BACKGROUND OF THE INVENTION

This invention relates to transverse axle mounting to a vehicle frame of the type employed by off-road vehicles.

Generally, the transverse axle of an off-road vehicle is bolted using cap screws directly to the vehicle frame, as illustrated in U.S. Pat. No. 3,604,527. Such arrangements fasten each of two axle housing faces to the frame. These arrangements can adequately withstand tensile loads developed by the vehicle, however, they are susceptible to failure due to high shear loads.

In operation, high torsional forces, such as those developed as a result of the vehicle wheels impacting a large ground object, are experienced by the axle causing the axle-frame mounting face to develop excessive shear loading highly localized about the securing bolts and high tensile loads in the securing bolts. As a result, damage to the axle and/or frame can result.

SUMMARY OF THE INVENTION

It is accordingly an object of the present invention to provide means for mounting a vehicle axle which isolates shear loads fom the axle frame interface.

It is a further object of the present invention to present a mounting arrangement which exhibits ease of assembly.

It is an added benefit of the present invention that the mounting assembly translate torsional load into tensile load more suitably carried by the vehicle frame.

It is a further benefit of the present invention that fewer axle mounting points are required for a given vehicle size.

The vehicle frame is formed with transversely aligned seats. Portions of the axle housing are formed and sized to be received in the seat. The axle housing is secured in the seat by a plurality of cap screws external vertically through the axle housing and seat wall. The seat further includes a plurality of horizontally extending cap screws adjustably mounted in the frame to each side of the axle housing. The cap screws are adjusted to about the axle housing below the axle horizon to restrain rotation of the housing and translate torsional load to tensile load to be distributed to the frame.

DESCRIPTION OF THE PREFERRED EMBODIMENT

Figure 1:
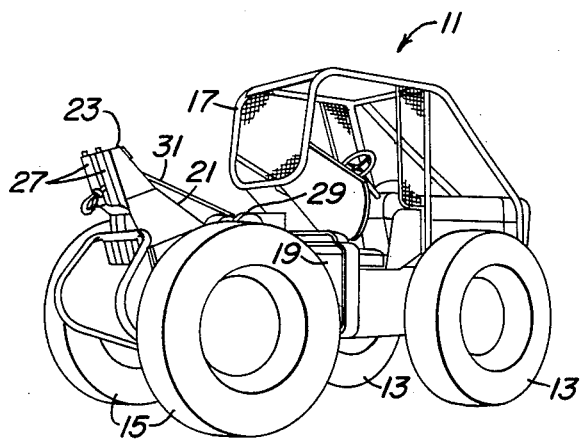
FIG. 1 is a perspective view of a wheeled log skidder tractor.

Referring to FIG. 1, the vehicle illustrated for the purpose of describing the invention is of the articulated or center-hinged log skidder type of tractor, generally indicated as 11, carried on front and rear wheels 13 and 15, respectively, and includes a protected operator's station 17.

The tractor 11 has a fore-and-aft body portion including a rear end 19 on which is mounted in any suitable fashion a support 21 which extends upwardly and rearwardly to provide fairlead 23, typically including a main horizontal roller 27. The body portion 19 further carries a typical winch 29 from which a cable 31 extends upwardly and rearwardly through the fairleads.

Figure 2:
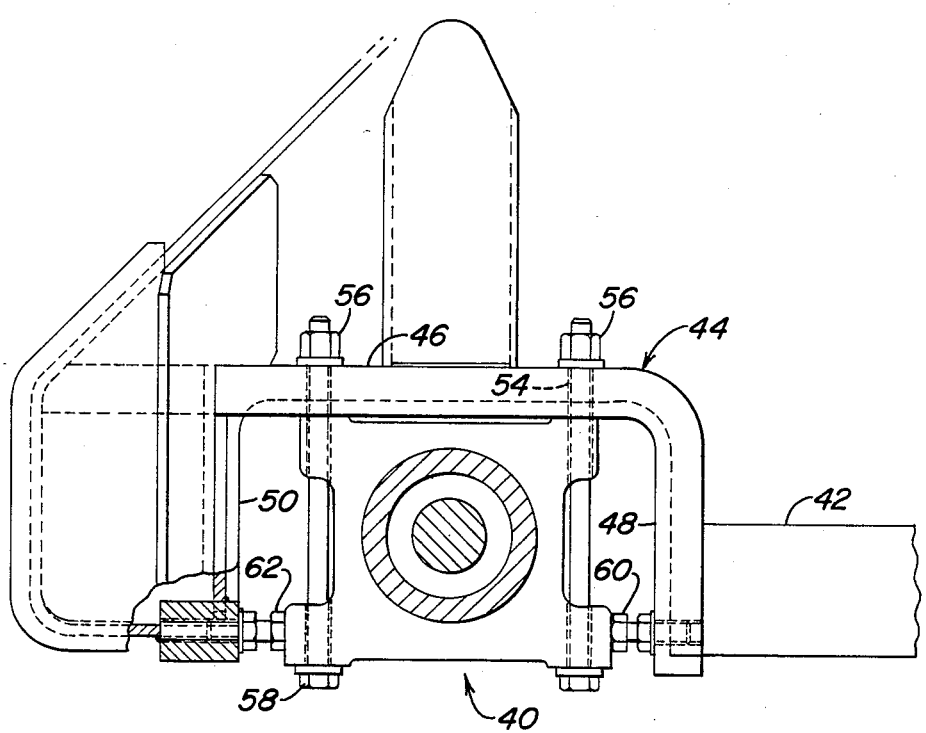
FIG. 2 is side section view of the rear-most portion of the tractor frame mounting of the axle housing in accordance with the present invention.
Figure 3:
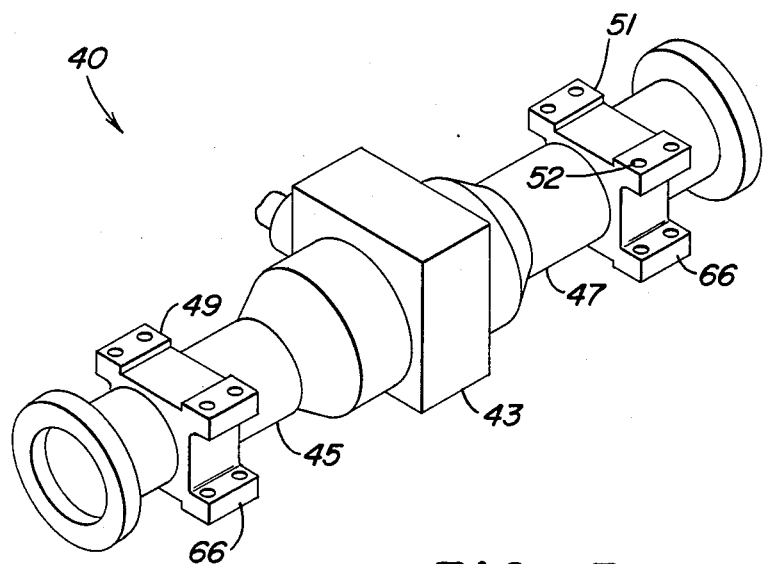
FIG. 3 is a prospective view of the axle housing of the tractor.

Referring more particularly to FIGS. 2 and 3, for the purpose of describing the invention, attention will be directed to the mounting of the rear axle 40 to the rear frame 42. The rear frame 42 includes inverted U-shape seat sections 44 aligned transversely to the frame 42 having a top portion 46 and parallel side walls 48 and 50.

The axle housing 40 includes a differential casing 43 with concentric outwardly and oppositely extending cylindrical sections 45 and 47. Mounting members 49 and 51 are fixably mounted by any conventional means to a respective section 44 and 46. Each mounting member 49 and 51 is sized and configured to be received within a respective seat 44 such that each of the mounting members 49 and 51 are in spaced apart relationship to the sidewalls 48 and 50 of the respective seat section 44. In the preferred embodiment mounting members 49 and 51 are generally rectangular in shape. Each mounting member 49 and 51 has a plurality of vertically aligned holes 52. A plurality of cap screws 58 are received in a respective holes 52 and extend into a mattingly aligned hole 54 in the top portion 47 of said seat 44. Nuts 56 are then secured to each respective cap screw 58 such that the axle 40 is now secured to the frame 42.

Fixably and adjustably mounted horizontally in the wells 44 within the lower portion of well walls 48 and 50 is a plurality of cap screws 60 and 62 respectively, such that the respective mounting members 49 and 51 are located therebetween. The head portions of cap screws 60 and 62 are adjusted to abut surface 66 of respective mounting members 49 and 51.

It is observed that should the axle 40 experience rotational loading, the placement of cap screws 60 and 62 translate the rotational loading to a compress load suitably carried by the cap screws 60 and 62 to the frame 42. It is further noted that the rotational load is thereby isolated and is not transmitted to cap screws 58.

We claim:

1. A improved means of mounting a transverse axle to the frame of a vehicle, said transverse axle having a differential casing and concentric outwardly and oppositely extending cylindrical sections, wherein the improvement comprises; said frame having a plurality of transversely aligned wells, each of said wells having a horizontally extending top wall and spaced-apart vertical sidewalls;

a plurality of mounting members formed on said cylindrical section of said transverse axle each of which is aligned to be received in partial abutting relationship to said top wall and in spaced apart relationship to said side walls of said respective wells, and each of said mounting members having a plurality of side surfaces located generally below the center of said respective cylindrical section opposite said side walls of said respective well; and rotational load transfer means for providing rigid communication between said surface of said mounting members and said respectively oppositely aligned sidewalls of said respective wells such that rotational loading of said transverse axle is transmitted to said side walls of said wells by said rotational load transfer means.

2. An improved means of mounting a transverse axle to the frame of a vehicle as claimed in claim 1, wherein said rotational load transfer means comprises a plurality of cap screws each having a screw head and a threaded stem, said threaded stem being threadably mounted horizontally in a respective sidewall of said well such that said screw head abuts one of said oppositely aligned surfaces.

* * * * *